Sept. 29, 1953

F. A. BROWNE, JR 2,654,080

MAGNETIC MEMORY STORAGE CIRCUITS AND APPARATUS

Filed June 19, 1952

3 Sheets-Sheet 1

Inventor:
Frank A. Browne, Jr.
by Robert J. Palmer
Attorney

Sept. 29, 1953 F. A. BROWNE, JR 2,654,080

MAGNETIC MEMORY STORAGE CIRCUITS AND APPARATUS

Filed June 19, 1952 3 Sheets-Sheet 2

Inventor:
Frank A. Browne, Jr.
by Robert T. Palmer
Attorney

Sept. 29, 1953 F. A. BROWNE, JR 2,654,080

MAGNETIC MEMORY STORAGE CIRCUITS AND APPARATUS

Filed June 19, 1952 3 Sheets-Sheet 3

Inventor:
Frank A. Browne, Jr.
by Robert T. Palmer
Attorney

Patented Sept. 29, 1953 2,654,080

UNITED STATES PATENT OFFICE 2,654,080

MAGNETIC MEMORY STORAGE CIRCUITS AND APPARATUS

Frank A. Browne, Jr., Brookline, Mass., assignor to Transducer Corporation, Boston, Mass.

Application June 19, 1952, Serial No. 294,515

14 Claims. (Cl. 340—174)

This invention relates to magnetic memory circuits and apparatus using magnetic binaries, and relates more particularly to magnetic binary shift registers, and to driving circuits for such registers.

In electronic computing systems, shift registers used for the storage of binary information, employ magnetic binaries for handling information on a digital basis. Such magnetic binaries as used in such systems, are described in an article entitled "Static magnetic storage and delay line" by An Wang and Way Dong Woo, published in volume 21 (January 1950) of the Journal of Applied Physics. Shift registers employing magnetic binaries are commonly referred to as "magnetic binary shift registers," and will be so referred to in the following.

A magnetic binary core in a magnetic binary circuit is capable of being magnetized to saturation in either of two directions. After such magnetization, the remanent flux in the core has the maximum possible value in either direction, and this maximum value is referred to as the retentivity of the core. Ordinarily the magnitude of retentivity is the same in either direction. The following convention is used to assign algebraic signs and information content to the directions. Two states are said to arise from the two directions: a positive or active state in which the direction of retentivity is opposite to that which would result from the application of a sensing or shift pulse to a shift winding on the core; and a negative, or inactive, state in which the direction of retentivity is the same as that which would result from the application of a shift pulse to a shift winding. When applied to a core in the active state, a shift current causes the inactive state to appear. When applied to a core already in the inactive state, a shift pulse causes no change in state.

A current pulse applied to a winding in such a manner as to create a magnetomotive force opposite in direction to that created by the shift pulse, will cause the active state to appear, or, if already present, to be maintained. Because of the property of saturation displayed by the cores, the two states are stable and reproducible.

In digital work the convention further requires that a core in the active, or positive, state, be said to contain or store a binary digit "one," and that a core in the negative, or inactive, state, be said to contain the digit "zero." Thus the quantity stored in the representation of digital information is residual magnetic flux. Each core can store but one digit, and the action of the shift pulse is always to create or maintain the "zero" condition.

Prior magnetic binary shift registers have used three windings on each magnetic binary transformer core, one winding being used to receive information transmitted from preceding apparatus, a second winding being used to transmit the information to following apparatus which may be another magnetic binary, and the third winding being used as the shift winding through which current pulses are passed to shift the transformer core to the inactive state. The shift current pulses previously supplied to such shift windings have been rectangular in waveform.

When a magnetic binary core shifts from one state to another, a voltage is induced in all of the windings on it. A shift current pulse will have no substantial effect on a given core in the inactive state and substantially no voltage should be induced in its transmitting winding. A shift current applied to a core in the active state will shift the core to the inactive state, and voltage will be induced in its transmitting winding.

In the terminology usually employed, a "one" signal is the voltage induced by a change in core state caused by a shift pulse. A "zero" signal is the relatively small parasitic voltage occurring where there is no change of state caused by a shift pulse wherever a shift current pulse is applied to a binary. A single piece of information is called a "baud."

The cores of magnetic binaries are usually toroidal and the separate windings are usually spaced uniformly apart around the core. There is an air flux path between the separate windings in addition to the core flux path. The core flux path is non-linear since the response of the core to a shift pulse depends upon the state into which the core was set by a previously applied signal current. However, the air flux path is linear since it is independent of the state to which the core was previously set. Thus, especially where it is necessary to place separate windings closely together on a core as where large numbers of turns are required for some duties, or where more than three windings are used, the magnetic coupling between the shift and transmitting windings through air paths may be sufficient to produce a "zero" signal of sufficient amplitude to act as a "one" signal when a shift current pulse is applied and the core is in the inactive state. Thus, a magnetic binary shift register may spuriously generate "ones" when its shift and transmitting windings are tightly coupled and square-wave shift current pulses are used.

A feature of my invention is that the zero-signal voltages resulting from air coupling between the shift and transmitting windings of a magnetic memory device such as a magnetic binary shift register, are greatly reduced in peak amplitude by the provision of shift-current pulses having rounded front edges which reduce the rate of change of the flux that produces the zero signal voltages.

Another feature of my invention resides in reducing the number of windings on a magnetic binary core of a shift register by combining the shift and transmitting windings in one winding and in using rounded shift current pulses. Using rectangular wave shift-current pulses in such a winding would result in very large zero signals since the shift current would flow through the same winding in which the output signal voltage is induced, and an air-coupling coefficient of unity would be obtained.

By using shift-current pulses having rounded front edges the peak amplitudes of the zero signal voltages are reduced sufficiently for satisfactory operation of the binaries with reduced numbers of windings. Thus, the three windings of a typical magnetic binary can be reduced to two without a loss in performance.

An object of this invention is to improve the operating stability of magnetic memory devices such as magnetic binary shift registers.

Another object of this invention is to prevent the appearance of more "ones" or positive bauds in a magnetic binary shift register, than were stored in the register.

Another object of this invention is to provide an improved shift-current pulse-generator for a magnetic memory device such as a magnetic binary shift register.

Another object of this invention is to increase the ratio between the peak amplitudes of "one" signals and "zero" signals in a magnetic memory device such as a magnetic binary shift register.

The invention will now be described with reference to the drawings, of which:

The magnetic binary cores referred to in the following description may be constructed from "Deltamax" manufactured by Arnold Engineering Company, having the characteristics described in said article in the Journal of Applied Physics. The Carter-Hammel Patent No. 2,591,406 discloses the use of such cores in pulse generating circuits.

Figure 1:
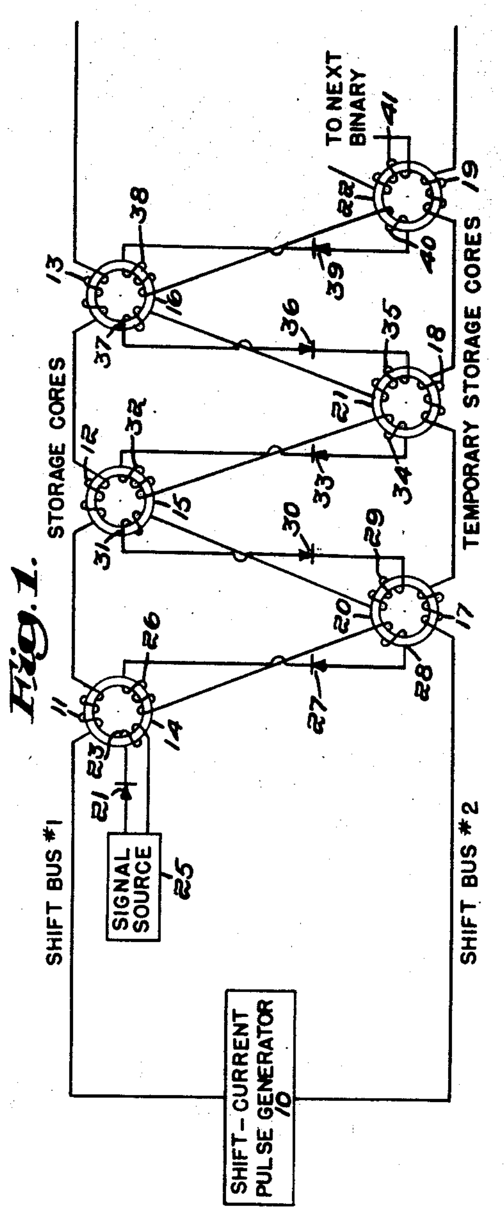
Fig. 1 is a circuit schematic of several stages of a conventional magnetic binary shift register having three windings on each magnetic binary core.

Referring now to Fig. 1 of the drawings, the generator 10 ordinarily would deliver square-wave shift-current pulses through the shift-bus #1 to the series-connected shift windings 11, 12 and 13 of the storage cores 14, 15 and 16 respectively. Likewise the generator ordinarily would deliver square-wave shift-current pulses through the shift-bus #2 to the series-connected shift windings 17, 18 and 19 of the temporary storage cores 20, 21 and 22 respectively.

The receiving winding 23 of the first storage core 14 is connected through the rectifier 21 to the signal source 25. The transmitting winding 26 of the first storage core 14 is connected through the rectifier 27 to the receiving winding 28 of the first temporary storage core 20. The transmitting winding 29 of the first temporary storage core 20 is connected through the rectifier 30 to the receiving winding 31 of the second storage core 15. The transmitting winding 32 of the second storage core 15 is connected through the rectifier 33 to the receiving winding 34 of the second temporary storage core 21. The transmitting winding 35 of the second temporary storage core 21 is connected through the rectifier 36 to the receiving winding 37 of the third storage core 16. The transmitting winding 38 of the third storage core 16 is connected through the rectifier 39 to the receiving winding 40 of the third temporary storage core 22. The transmitting winding 41 of the third temporary storage core 22 would be connected through a rectifier to the receiving winding of the next core in order, and so on.

If a baud is stored in the first storage core 14, the application of a shift current pulse from the generator 10, through the shift bus #1, will shift out the information stored in the storage core, and will cause this baud to be transferred to the first temporary storage core 20. The application of a shift current pulse from the generator through the shift bus #2, will cause this baud to be transferred to the second storage core 15.

One cycle of operation consists of pulsing first, the storage cores and then the temporary storage cores. At the end of this cycle the baud has advanced from the first storage core to the second storage core. At any time between the application of shift pulses to the storage cores, new bauds may be read in since the first core has been cleared of stored material by the preceding shift.

The rectifiers between the transmitting and receiving windings provide that current flows only in the desired direction.

Figure 2:
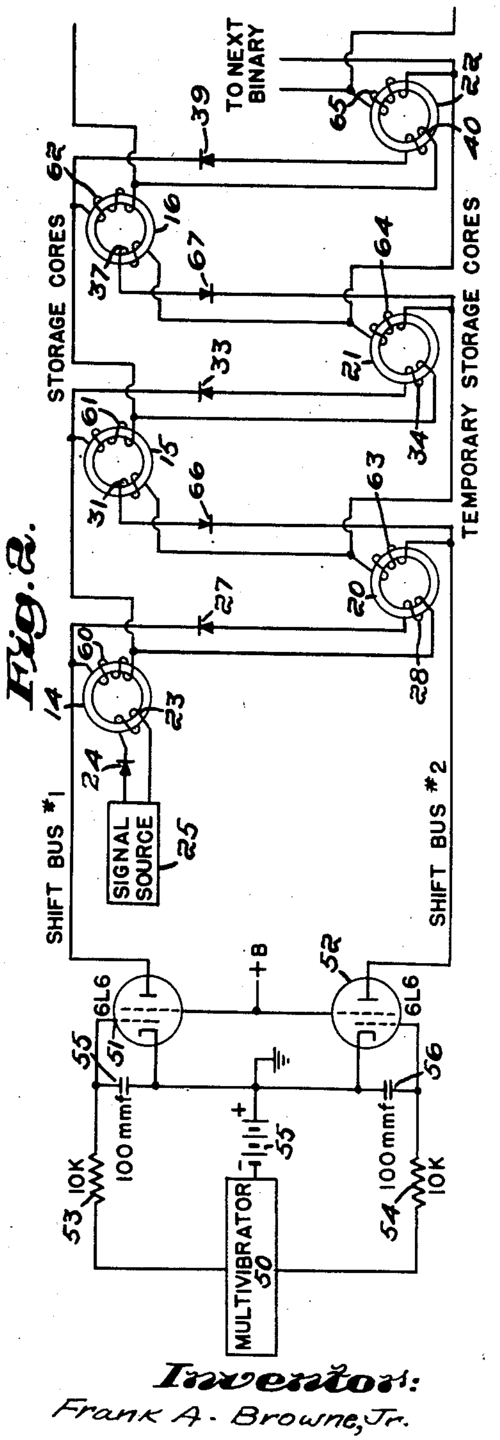
Fig. 2 is a circuit schematic of a similar shift register in which the three windings on each magnetic binary core are reduced to two.

Referring now to Fig. 2 of the drawings which illustrates an embodiment of my invention, square-wave voltages from a conventional multivibrator 50 are delivered to the control grids of the tubes 51 and 52 which may be 6L6s, through the 10,000 ohm resistors 53 and 54 respectively. The cathodes of the tubes are connected together and to ground, and to the positive terminal of the bias battery 55, the negative terminal of which is connected to the multivibrator 50 so that the tubes 51 and 52 are biased beyond cutoff. The screen grids of the tubes are connected to the positive terminal of the usual "B" voltage source. The anode of the tube 51 is connected to the shift bus #1, and anode of the tube 52 is connected to the shift bus #2. The capacitors 55 and 56 are connected between the control grids and cathodes of the tubes 51 and 52 respectively. The positive terminal of the "B" voltage source would also be connected to the last of the shift windings of the register.

The storage cores 14, 15 and 16 have the usual receiving windings 23, 43 and 37 respectively, the winding 23 of the first core being connected through the rectifier 24 to the signal source 25 as in Fig. 1. The temporary storage cores 20, 21 and 22 have the usual receiving windings 28, 34 and 40 respectively.

The storage cores 14, 15 and 16 have the combined shift and transmitting windings 60, 61 and 62 respectively. The temporary storage cores 20, 21 and 22 have the combined shift and transmitting windings 63, 64 and 65 respectively.

The windings 60, 61 and 62 are connected in series with the shift bus #1. The winding 60 of the first storage core 14 is also connected in parallel with the series combination of the rectifier 27 and the receiving winding 28 of the first temporary storage core. The winding 61 of the second storage core 15 is also connected in parallel with the series combination of the rectifier 33 and the receiving winding 34 of the second temporary storage core 21. The winding 62 of the third storage core 16 is also connected in parallel with the series combination of the rectifier 39 and the receiving winding 40 of the third temporary storage core 22.

The windings 63, 64 and 65 are connected in series with the shift bus #2. The winding 63 of the first temporary storage core 20 is connected in parallel with the series combination of the rectifier 66 and the receiving winding 31 of the second storage core 15. The winding 64 of the second temporary storage core is also connected in parallel with the series combination of the rectifier 67 and the receiving winding 37 of the third storage core 16.

The winding 65 of the third temporary storage core 22 would be connected in parallel with the series combination of a rectifier and the receiving winding of the next storage core, and so on.

In the operation of the shift register illustrated by Fig. 2, the wave-forming circuits, including the resistors 53 and 54, and the capacitors 55 and 56, change the rectangular wave forms of the voltage from the multivibrator 50 to rounded voltage pulses which are applied to the control grids of the tubes 51 and 52. In the anode circuits of the tubes, rounded shift current pulses as illustrated by Fig. 4A of the drawings, are applied to the shift windings. If a baud is stored in the first storage core 14, the application of a rounded shift-current pulse through the shift bus #1 will shift out the information stored in the first storage core, and will cause this baud to be transferred through the combined shift and transmitting winding 60 of the first storage core, the rectifier 27 and the receiving winding 28 of the first temporary storage core 20, to the core 20. The subsequent application of a rounded shift current pulse through the shift bus #2 will cause the baud to be transferred through the combined shift and transmitting winding 63 of the core 20, the rectifier 66 and the receiving winding 31 of the second storage core 15, to the core 15, and so on.

The operation of the shift register of Fig. 2 is thus similar to that of Fig. 1 as far as the cycling is concerned, the only difference between Figs. 1 and 2 being that the binaries of Fig. 2 have two windings instead of three, and that rounded shift current pulses instead of square wave ones are used.

The shift register of Fig. 2 will not operate satisfactorily with square-wave shift-current pulses as will be shown by the following analysis using the c.g.s-e.m.u system of units and with:

$I$=shift bus current.
$\phi_C$=flux in the core of a binary, produced by I.
$\phi_A$=flux in the air separating a shift winding from a core, produced by I.
$A_C$=cross-sectional area of the core.
$A_W$=cross-sectional area of the winding.

The induction change from maximum residual B to the corresponding saturation B for Deltamax is about 1,000 gauss. Binaries having single-turn cores of 0.001'' thickness x 0.12'' width x 0.375'' diameter will be considered. The zero-signal core flux change $\Delta\phi_{Co}$ is:

$$\Delta\phi_{Co}=\Delta B_{Co}A_C$$

$$\Delta\phi_{Co}=(10^3\text{ gauss})\,(0.001'')(0.12'')\left(\frac{6.45\text{ cm.}^2}{\text{in.}^2}\right)$$

$$\Delta\phi_{Co}=0.77\text{ maxwell}$$

The zero-signal air-flux change $\Delta\phi_{Ao}$ will be computed approximately from the following considerations:

1. A shift winding has a mean diameter of 0.2''; its 80 turns occupy 0.5'' of the circumference of the toroidal core case. The shift-bus current is 0.2 ampere.

2. The cross-sectional area of the core is small compared to the cross-sectional area of the winding; $A_C$ will therefore be neglected.

3. The winding will be treated as a portion of an infinite close-wound solenoid.

Therefore:

$$H=4\pi\,\frac{(\text{number of turns})(\text{shift bus current})}{\text{axial length of coil}}$$

$$=\frac{(4\pi)(80\text{ turns})(0.2\text{ amp})\,\frac{(0.1\text{ abampere})}{\text{ampere}}}{(0.5'')\left(\frac{2.54\text{ cm.}}{\text{in.}}\right)}$$

$$=15.8\text{ oersteds.}$$

$$\Delta B_{Ao}=\mu_0 H=15.8\text{ gauss}$$

$$\Delta\phi_{Ao}=B_{Ao}A_W=(15.8\text{ gauss})\,\frac{(\pi(0.2'')^2}{4}\,\frac{(6.45\text{ cm.}^2)}{\text{in.}^2}$$

$$\Delta\phi_{Ao}=3.20\text{ maxwells}$$

$$\Delta\phi_o\text{ total}=\Delta\phi_{Co}+\Delta\phi_{Ao}=0.77+3.20=3.97\text{ maxwells}$$

$$\frac{\Delta\phi_o\text{ total}}{\Delta\phi_{Co}}=\frac{3.97}{0.77}=5.2$$

Thus, within the shift winding, there occurs a total zero-signal flux change which is of the order of five times that due to the Deltamax core alone. This result has been verified experimentally by comparing, across shift windings, the zero signals of good binaries with the zero signals of "binaries" which have no cores. The wave forms are practically indistinguishable.

Shift-registers having the circuit of Fig. 2 are required therefore, to be actuated by shift pulses having a small rate of rise, in order that the large parasitic air-flux will have a small rate of change and consequently will produce a small peak zero signal voltage.

The impedance presented to the shift-bus currents by a typical combined shift and transmitting winding of a core in the zero state is predominantly inductive, thus, the magnitude of the inductance is, approximately $$L=\frac{(\text{number of turns})(\Delta\phi_o\ \text{total})}{\text{shift-bus current}}$$

$$=\frac{(80\ \text{turns})(3.97\ \text{maxwells})}{(0.2\ \text{amp.})\dfrac{(0.1\ \text{abampere})}{\text{ampere}}}$$

$$=15.9\times10^3\ \text{abhenries}$$

$$=15.9\times10^3\ \text{abhenries}\times\frac{10^{-9}\ \text{henry}}{\text{abhenry}}\times\frac{10^6\mu\text{H.}}{\text{henry}}$$

$$=15.9\ \mu\text{H.}$$

Figures 5A, 5B:
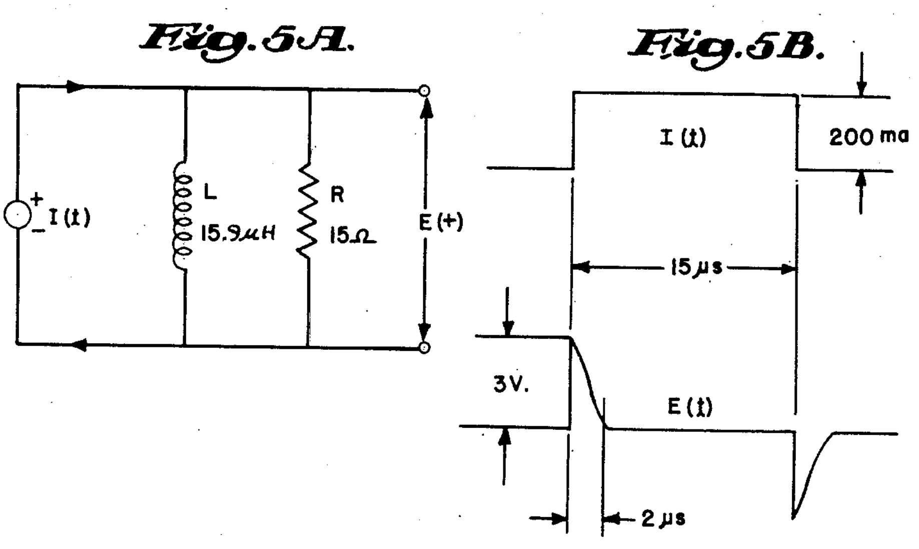
Fig. 5A is an equivalent circuit of a rectangular wave generator connected to a shift winding of a magnetic binary in the "zero" state.
Fig. 5B is a graph illustrating the wave form of the zero-signal voltage across the shift winding of Fig. 5A when a rectangular shift-current pulse is passed through it.

The impedance shunted across such a winding of a storage core by the series combination of the rectifier and the receiving winding of a following temporary storage core is predominantly resistive; the magnitude of the (non-linear) resistance is approximately 15 ohms. The parallel L-R circuit thus formed has a time constant of one microsecond. Fig. 5A shows the equivalent circuit, and Fig. 5B shows its calculated response to the 15 micro-second-200 ma. shift-bus current rectangle applied to it.

The waveform of Fig. 5B is very similar to the zero-signal waveform obtained in a two-winding shift register when rectangular shift current pulses are used. The waveform is a particularly unfavorable one because of its large initial amplitude (the peak amplitude of a positive-baud signal is only slightly greater). The interbinary rectifier linking the combined shift and transmitting winding of a core with the receiving winding of a following core is counted upon to reduce zero-signal currents in such a receiving winding by virtue of the non-linear rectifier volt-ampere characteristics, but the desired function of amplitude selection cannot be performed effectively in a two-winding register because of the large initial amplitudes of the zero signals.

Figure 6A:
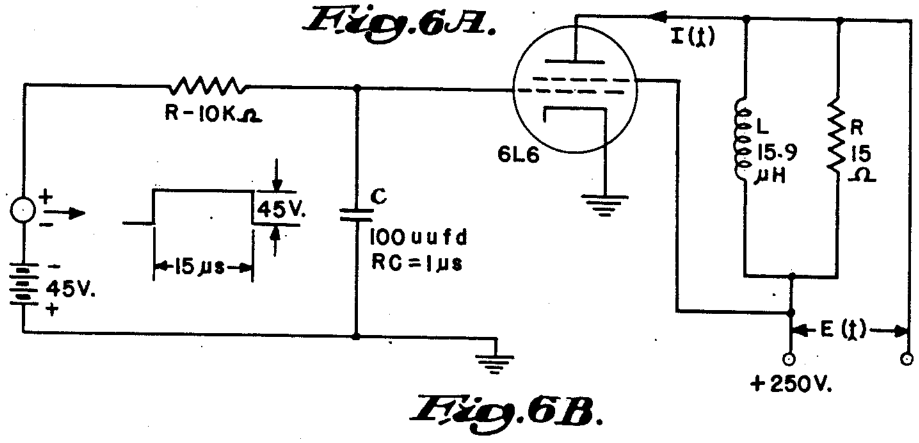
Fig. 6A is an equivalent circuit of the rounded wave generator of Fig. 2 connected to a shift winding of a binary in the zero state.

Suppose now that the shift-bus current has a waveform given by the following equations which apply to the rise and fall of the anode current of the tubes 51 and 52 during a pulse applied to their central electrodes:

(Rising anode current) $I(t)=0.2(1-e^{-t})$ and $t\leqq 15\ \mu\text{sec.}$ (Falling anode current) $I(t)=0.21(15-)e^{-t}$ and $t\geqq 15\ \mu\text{sec.}$ where $I(t)$ is in amperes, $t$ is in microseconds, and $I(15-)$ is the value of $I(t)$ just prior to $t=15$ microseconds. Such a waveform can be generated by the circuit of Fig. 6A which is an equivalent circuit of the rounded current pulse generator of Fig. 2 connected to a combined shift and transmitting winding.

Figure 6B:
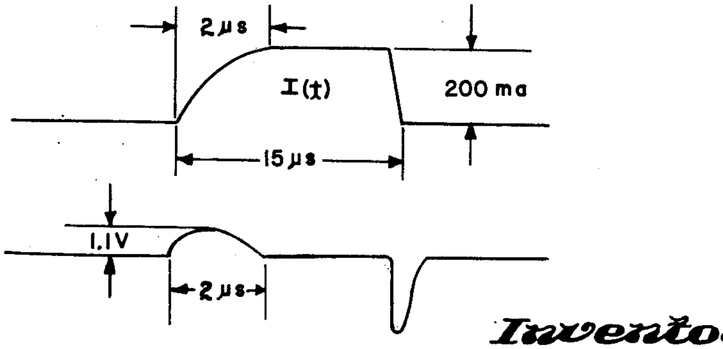
Fig. 6B is a graph illustrating the wave form across the shift winding of Fig. 6A when a rounded wave shift current pulse is passed through it.

The voltage $E(t)$ in Fig. 6B is given by $$E(t)=3te^{-t},\ 0<t<15\mu\text{sec.}$$

This voltage is much more favorable for a zero-signal as may be seen by finding the maximum value of $E(t)$:

$$\frac{d}{dt}[E(t)]=3[t(-1)e^{-t}+(1)e^{-t}]=0$$

whence $t_{E_{\max(t)}}=1$ microsecond and $$E_{\max(t)}=3e^{-1}=3\times0.37=1.11$$

volts as compared to 3 volts produced by the square wave shift current.

The areas under the zero-signal voltage waveforms obtained with either the rectangular or the rounded-edge shift-bus current, will be the same because the same total flux change $\Delta\phi_o$ total will have occurred in the winding. The analysis is admittedly inexact because of the rectifier non-linearity. However, the analysis does show that the maximum zero-signal voltage can be very considerably reduced by rounding the edges of the shift-pulse currents. The reduced zero-signal amplitudes permit the rectifier to exercise a degree of amplitude selection which will insure satisfactory operation of the two-winding shift register.

Figs. 3 and 4 of the drawings are oscillograms of waveforms observed in a two winding shift register.

Figure 3B:
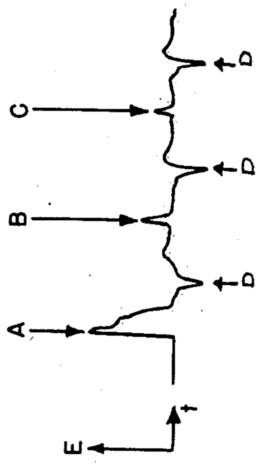
Fig. 3B is an oscillogram of the voltages of a "one" signal, a "zero" signal directly following a "one" signal, and a normal "zero" signal, the voltage readings being taken directly across a shift winding of a two-winding register such as is illustrated by Fig. 2, the voltages being produced by the rectangular shift pulses illustrated by Fig. 3A.
Figure 3A:
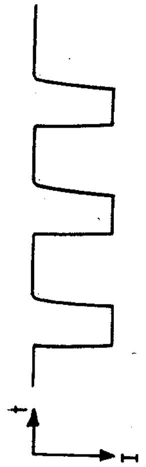
Fig. 3A is an oscillogram of the rectangular shift current pulses normally used with the shift register of Fig. 1.

Fig. 3B is an oscillogram of voltages across a combined shift and transmitting winding with the square wave current pulse of Fig. 3A passed through the winding.

Figure 4B:
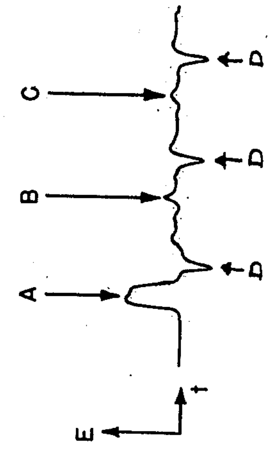
Fig. 4B is an oscillogram similar to Fig. 3A, illustrating the "one" and "zero" voltages produced in a shift register winding of Fig. 2 with the rounded shift pulses of Fig. 4A.
Figure 4A:
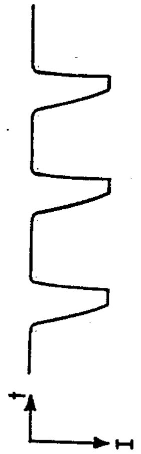
Fig. 4A is an oscillogram of rounded shift pulses used in the operation of Fig. 2.

Fig. 4B is an oscillogram of voltages across the same winding with the rounded current pulses of Fig. 4A passed through the winding. It will be noted that the amplitudes of the "zero" voltages relative to the "one" voltages are greatly reduced by using rounded shift current pulses, so that by using rounded shift current pulses, the probability of a "one" being spuriously produced by a zero signal is eliminated.

In Figs. 3B and 4B, the voltages A are "one" signal voltages; the voltages B are "zero" signal voltages following "one" signal voltages and the voltages C are normal signal voltages. The voltages B and C are parasitic voltages, the voltages C resulting from air flux changes and from the changes between the saturation and maximum residual fluxes of the cores. The voltage B has a higher peak amplitude than the voltage C because of the so-called "kick-back" effect due to the parasitic coupling to the preceding binary. The negative voltages D result from the collapse of the field flux, and play no part in a shift register circuit.

The invention is not limited to two winding shift registers. In shift registers having more than two windings, where the coupling between the windings is tight, and the air flux set up by a shift winding links a transmitting winding, the zero signals induced in the transmitting winding will be excessively large when square wave shift current pulses are used, and will be greatly reduced by using rounded shift current pulses according to this invention. In such a case, the circuit of Fig. 1 could be used, with the generator 10 of Fig. 1 being a rounded shift current pulse generator.

While embodiments of the invention have been described for the purpose of illustration, it should be understood that the invention is not limited to the exact apparatus and circuits illustrated, since modifications thereof may be suggested by those skilled in the art, without departure from the essence of the invention.

What I claim as my invention is:

1. Magnetic memory apparatus comprising first and second magnetic binary storage core, means including a winding on said first core for storing a baud in said first core, and means including a generator of rounded shift current pulses and windings on said first and second cores for transferring the baud from the first to the second core.

2. Magnetic memory apparatus comprising first and second magnetic binary storage cores; means including a receiving winding on said first core for storing a baud therein; a combined shift and transmitting winding on said first core; a receiving winding on said second core; a rectifier; connections connecting said shift and transmitting winding, in series with said rectifier, to said receiving winding on said second core, and means for producing and supplying a rounded shift current pulse to said shift and transmitting winding for causing the baud stored in said first core to be transferred to said second core.

3. The invention claimed in claim 2 in which the means for producing the rounded pulse comprises a rectangular wave generator, and a rounded wave generator connected to the rectangular wave generator.

4. Magnetic memory apparatus comprising first and second magnetic binary storage cores, means including a receiving winding on said first core for storing a baud therein, shift and transmitting windings on said first core, a receiving winding on said second core, connections including a rectifier connecting said transmitting winding to said receiving winding on said second core, and means for generating and supplying a rounded shift current pulse to said shift winding for causing said baud to be transferred to said second core.

5. The invention claimed in claim 4 in which the means for generating the rounded pulse comprises a rectangular wave generator, and a rounded wave generator connected to the rectangular wave generator.

6. In combination with a magnetic memory device having a shift winding on a binary core, a shift current pulse generator comprising a rectangular wave generator, an electronic device having a control electrode, a cathode and an anode, means including a resistor connecting said control electrode to said generator, means including a bias voltage source for biasing said device below cut-off connecting said cathode to said square wave generator, a capacitor connecting said control electrode to said cathode, and connections for connecting said anode to said shift winding.

7. In combination with magnetic memory apparatus having binary storage cores with shift windings thereon, a generator of shift current pulses having rounded forward edges, connected to said shift windings.

8. The invention claimed in claim 7 in which the generator is connected to a rectangular wave generator.

9. In combination with magnetic memory apparatus having storage cores with shift windings thereon, an electronic device having an anode connected to said shift windings, and having a control electrode and a cathode, a rectangular wave generator, means including a resistor connecting said control electrode to said generator, means including a bias voltage source for biasing said device below cut-off, connecting said cathode to said generator, and a capacitor connecting said control electrode to said cathode.

10. Magnetic memory apparatus comprising a plurality of storage cores, a plurality of temporary storage cores, receiving windings on said cores, combined shift and transmitting windings on said cores, means including rectifiers connecting receiving windings on said temporary storage cores with the combined shift and transmitting windings on the first mentioned storage cores, means including rectifiers connecting the combined shift and transmitting windings on said temporary storage cores to the receiving windings on said first mentioned cores, and means including a generator of current pulses having rounded forward edges for delivering shift current pulses to said combined shift and transmitting windings.

11. The invention claimed in claim 10 in which the generator is connected to a rectangular wave generator.

12. In combination with a magnetic memory device including a magnetic binary core with a shift winding thereon, a generator of rounded shift current pulses connected to said winding.

13. In combination with a magnetic memory device including a magnetic binary core with a shift and a receiving winding thereon, a generator of rounded shift current pulses connected to said shift winding, and a signal current source connected to said receiving winding.

14. Magnetic memory apparatus comprising first and second magnetic binary storage cores, means including a receiving winding on said first core for storing a "one" therein, a shift winding on said first core, means for supplying a rounded wave shift current pulse to said shift winding, a transmitting winding on said first core, and a receiving winding on said second core connected to said transmitting winding.

FRANK A. BROWNE, JR.

References Cited in the file of this patent

UNITED STATES PATENTS

| Number | Name | Date |
|---|---|---|
| 2,591,406 | Carter | Apr. 1, 1952 |

OTHER REFERENCES

Edvac: Progress Report (2), Moore School, Univ. of Penn., June 30, 1946, pp. 4-21 to 4-30, drawings PY-O-164, 165.

Kincaid: "Static Magnetic Memory . . . ," Electronics, January 1951, pp. 108-111.

Haynes: "Magnetic Cores as Elements of Digital Computing Systems," December 28, 1950, pp. 21-24, 46-50, 57 and 58.